June 28, 1966  F. B. ROBB  3,258,084
AERIAL LIFT CONSTRUCTION
Filed April 1, 1964
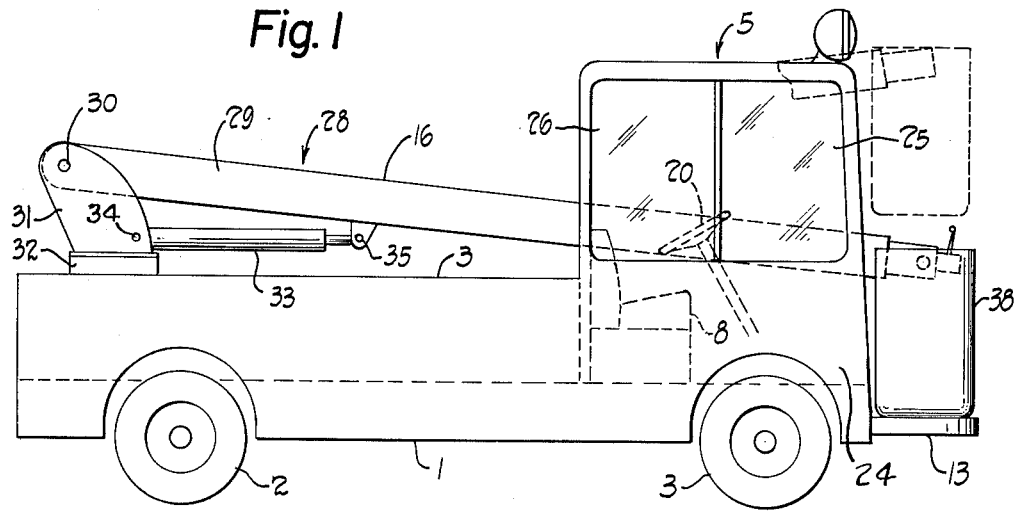
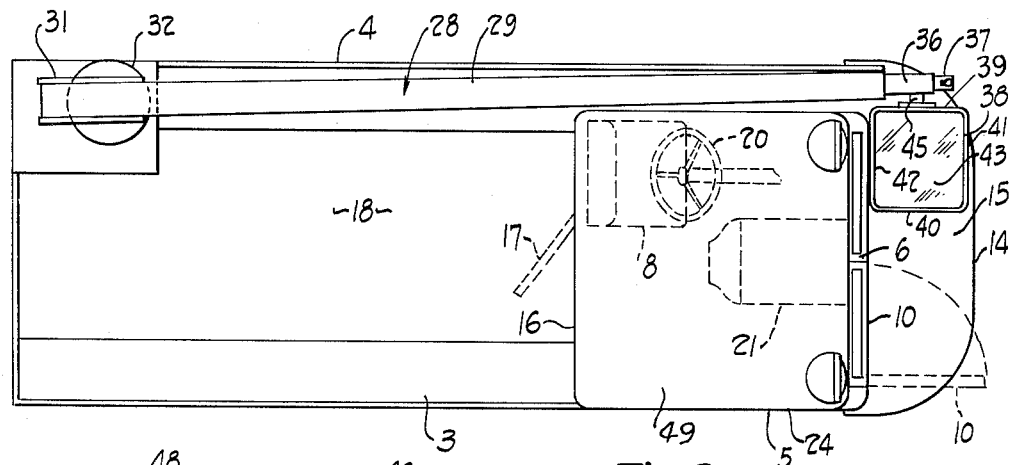
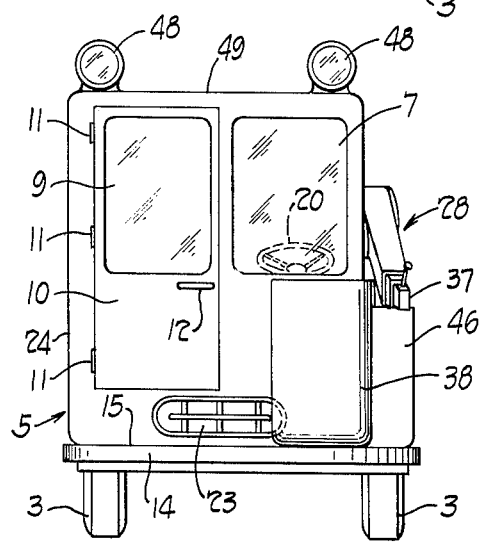
INVENTOR.
F. B. ROBB
BY
Robb & Robb
attorneys

United States Patent Office 3,258,084
Patented June 28, 1966

3,258,084
AERIAL LIFT CONSTRUCTION
Frank B. Robb, Willoughby, Ohio
(1220 Huron Road, Cleveland, Ohio)
Filed Apr. 1, 1964, Ser. No. 356,575
4 Claims. (Cl. 182—13)

This invention relates to aerial lift construction and particularly to highly mobile apparatus of this class, particularly suitable for personnel and relatively light general purpose use.

There have been a number of different types of this apparatus conceived, patented and put into use, with the general types being classified as those in which the basket can be said to be parked above the cab, in rear of the cab, and alongside or at one side of the cab of the truck or other vehicle upon which the lift apparatus per se is carried.

The latter type of apparatus is the one particularly improved upon hereby, although the first mentioned types are vastly improved upon even by the type in which the basket or platform is parked along side or at one side of the cab of the vehicle upon which the device is mounted as a whole.

While this latter type of apparatus or construction provide somewhat better access to the basket, it does reduce the cab interior area since what is termed a half cab is usually provided therefor, and makes access into the cab from curb side more difficult as well as having certain other disadvantages which are hereinafter enumerated.

Specifically, this last described type also necessitates a relatively high mounting of the boom upon a turret to familitate access to the cab from curb side, and to likewise provide for increased reach because the boom is basically pivoted or supported from a relatively high position.

Another disadvantage of the type now being described, is that the basket may interfer with vision during movement of the vehicle upon which the lift is mounted.

Further disadvantages are that the vehicle is necessarily somewhat controlling of the actual boom length since in order to position a basket adjacent or alongside or at one side of the cab, the boom must necessarily be shortened unless a wheel base of the vehicle is vastly increased.

Additionally, the center mounting of the turrets upon which booms in the last class now being described interferes with use of the area in rear of the cab for equipment and certain supplies as stringing gear or the like.

With the foregoing in mind, the present invention largely and virtually entirely eliminates the previous objections heretofore enumerated, and provides positive advantages not heretofore afforded in a large majority of the vehicles and lift constructions of this class.

Specifically, the cab interior area of the instant vehicle is maintained without obstruction so that access to and from the same is unimpeded and in fact improved in many aspects, without necessarily increasing the cost of the vehicle and by certain modifications which are novel in their application in this type of vehicle.

Further, the mounting of the boom is such that the center of gravity of the same is lowered as to its support and position from which the same is pivoted.

The basket in the instant invention is one which is located so as not to obstruct the view of the vehicle operator in fact it is one of the important features of this invention that the basket or platform is accessible and yet does not obstruct the view, further enabling the use of a type of basket which is advantageous from an insulating standpoint.

The arrangement of the basket or platform is such that it is readily accessible to the driver or operator of the vehicle where one man operation is feasible and desirable and likewise permitted.

Another distinct advantage of the instant invention is that the wheel base of the vehicle basically can be reduced and yet the boom length maintained or actually increased over prior construction where desirable.

Another very important advantage of the instant invention is that the boom structure as such is located at one side of the vehicle and thus leaves clear the entire area on the other side of the vehicle for other equipment, at the same time making the interior of the aft section of the vehicle much more usable for any purpose to which the vehicle may properly be devoted.

Another feature of the invention is the revised concept of accessibility to and from the cab, which improves the arrangement thereof, and at the same time facilitates ready access to and egress from the basket or platform as the same is used in operation.

Other and further advantages and objects of the invention will be understood from a consideration of the specification appended hereto and disclosed in the drawings wherein:

FIGURE 1 is a side elevational view of a vehicle arranged in accordance with this invention illustrating the form or shape of the cab and location of the lift unit with respect thereto as well as indicating the usual provisions in a vehicle of this type.

FIGURE 2 is a top plan view further illustrating the arrangement of the improved elements thereof and the relationship thereof in this structure.

FIGURE 3 is a view, showing further the arrangement of the respective parts hereof taken from the front of the vehicle.

Referring now to FIGURE 1, a vehicle in which the lift construction hereof is incorporated, is generally indicated as including the chassis section 1 supported at the rear on drive wheels 2 and forwardly on steerable wheels 3, the usual construction of the rear portion of the body being indicated by the storage compartments designated 3 and 4 reference likewise being had to FIGURE 2 in this connection.

Arranged at the forward part of the vehicle, is a cab generally denoted 5, which in this instance comprises a substantially rectilinear compartment, having the forward wall 6, in which suitable provisions are made for vision by the driver in the form of a windshield area 7, at one side immediately in front of the driver, who is stationed at an operator's station generally indicated at 8 in FIGURES 1 and 2.

The other side of the forward or face of the vehicle is equipped with a similar windshield area designated 9, in this instance said area being carried in a door 10 hinged at 11 so as to swing outwardly as suggested by the dotted lines in FIGURE 2.

The door is provided with the usual handle and latch means such as 12 and is lockable in the usual manner likewise.

Access through the door 10 is afforded by a platform 13 which extends forwardly and is supported and connected to the chassis of the vehicle 1, in the form and terminating in a bumper section such as 14, with a surface 15 provided upon which the operator can stand to obtain access to the vehicle through the door 10 as will be readily understood by consideration of FIGURE 2.

The rear wall of the cab 5 denoted 16, is preferably equipped with a suitable door such as 17, opening outwardly as indicated by the dotted lines in FIGURE 2, so that an operator leaving the operator's station 8 can move onto the platform or floor 18 between the storage compartments 3 and 4 previously mentioned.

At the operator's station there is the usual steering wheel 20, connected in the usual manner to the front wheels 3 for steering the same.

The motor for driving the vehicle is generally suggested at 21, and is connected to a drive shaft and thence to suitable other parts for effecting drive of the rear wheels and thus the vehicle as a whole.

The vehicle as indicated in FIGURE 3 is equipped with a suitable opening such as 23 to afford supply of air to the engine 21.

It will be noted that the wall 24, being the curb side wall of the vehicle, is only equipped with the glass areas such as 25 and 26 there being no opening in said wall to facilitate access to the cab and this wall being susceptible of providing for storage beneath the windows or otherwise other equipment which would be useful in connection with the operation of the vehicle as a whole.

Adverting now to the lift unit of this invention, it will be seen that this lift unit is generally designated 28, and as such is mounted on the street side of the vehicle so to speak, the lift unit comprising a boom 29 connected at its lower end at 30 to a turret 31 mounted at the left rear corner of the vehicle, the turret 31 being in turn supported for rotation about a suitable mounting 32 therefor.

The boom 29 will therefore in conjunction with the turret be rotatable throughout 360 degrees horizontally, and movable by pivoting around the pivot 30 upwardly and downwardly within the limits afforded by the piston and cylinder unit generally designated 33, connected at 34 to the turret and at 35 to the boom itself.

The boom 29 may be termed the lower boom and is provided with an interiorly operating telescopically arranged upper boom designated 36, which is movable inwardly and outwardly within the boom 29 by any suitable means not here described since it may be largely conventional, under the control of a suitable control unit such as 37 mounted at the end of the boom 36.

At the outer end of the boom 36, there is also provided a basket denoted 38, which is generally rectangular in plan and likewise rectilinear in overall configuration as indicated in the several views provided with side wall 39, one parallel to that denoted at 40 with a forward wall 41 and a rear wall 42, the bottom of the basket being denoted 43 and being of generally suitable size so that a man can stand therein and thus use the area as a position from which to perform various tasks as they may occur or to which the vehicle may be susceptible of use as a whole.

It will be seen that the boom 29 with the upper boom 36 telescopically arranged therewithin has been positioned so that the basket 38 may be supported or at least positioned adjacent the platform surface 15, the connection of the basket 38 with the boom being in any suitable manner such as indicated at 45, this facilitating a maintenance of the basket at a level attitude irrespective of the position of the boom vertically or otherwise.

It will also be noted as viewed in the various figures that the basket 38 is below the line of vision of the operator in the operator's station, and thus the basket as such does not interfere with manipulation of the entire vehicle in its travel operation.

It will also be noted that the street side wall so to speak of the cab 5 is arranged with an offset section 46, upon which the boom 29 may be positioned for supporting the same during the inoperative location of the same as indicated in the various figures and particularly of course while the vehicle as a whole is travelling from place to place.

Suitable driving lights such as 48 may be provided in this instance located on the roof of the cab, said roof being designated 49.

In operation the vehicle as a whole may be entered by the driver stepping upon the platform 14, opening the door 10, and thus effecting ingress to the interior of the cab taking his position at the driver's station 8 and thence manipulating the vehicle as a whole to its place of intended use for aerial lift purposes.

Thereafter the driver will leave his station at 8, open the door 10, enter the basket 38, and by manipulating the controls 37 raise himself above and to the place where his operation as such is to be performed.

It will be understood that the boom lift unit 28 as a whole may be pivotally operated so that the person in the basket 38 can be moved toward the curb side or in any other direction found necessary for carrying out his work.

When it is desired that the operator again move the truck or vehicle to a new location, he will descend, locate the basket 38 in place on the platform surface 15 or near thereto, open the door 10, enter the vehicle and assume his position in operation.

Where more than one operator is desired by reason of the particular type of work to which the vehicle is promoted such as in the globe cleaning operation, a second person may stay within the cab, and hand to the operator in the basket 38 such equipment to clean globes as necessary at the same time receiving the dirty ones and with equipment which may be provided within the cab effecting the washing operation therewithin.

Since access to the rear area and specifically the platform 18 is provided by the door 17, this will likewise be advantageous and provide ready movement thereto as found necessary or desirable.

It is pointed out that any suitable power supply for hydraulic operation of the turret 31 or the lift unit 28 as a whole may be effected from a power take off driven by the motor or separately as may be found most suitable under the circumstances.

The actual connections to these various elements are not shown in detail since they do not form a part of this invention per se but are readily provided by those who have the necessary skill in the art.

I claim:

1. In aerial lift vehicle construction of the class described, in combination, a self-propelled vehicle, a cab for said vehicle, an operator's station in said cab, a turret at the rear of the vehicle, a boom extending along the left side of said vehicle and mounted on said turret, a basket at the free end of the boom extending transversely in front of the cab, a forward opening door in the front of the cab near the side opposite the boom, and a platform extending in front of the cab to provide access to the basket from the cab through the said door.

2. In aerial lift vehicle construction of the class described, in combination, a self-propelled vehicle, a cab for said vehicle, an operator's station in the cab, a turret in rear of the cab, a boom extending along the left side of said vehicle from the turret, a basket at the free end of the boom extending transversely in front of the cab below the operator's normal forward line of sight, a forward opening door in the front of the cab near the side opposite the boom and a platform extending in front of the cab to provide access to the basket from the cab through the said door.

3. In aerial lift vehicle construction of the class described, in combination, a self-propelled vehicle, a cab for said vehicle, a driver's station in the cab, a turret in rear of the cab on the vehicle, a boom extending from said turret along the left side of the vehicle within the vertical outline thereof, a basket at the free end of the boom extending transversely in front of the cab, a forward opening door in the front of the cab near the side opposite the boom, a platform extending forwardly from the vehicle at about bumper height, to provide access from the cab through the said door, and means to operate the boom, basket, and turret.

4. In aerial lift vehicle construction of the class described, in combination, a self-propelled vehicle, a cab thereon, an operator's station at one side of the cab, a turret on the vehicle rearwardly of the cab, the boom mounted on the turret for swinging and vertical movement, said boom extending along the side of the vehicle where the operator's station is located, a basket at the end of the boom extending in front of the said station below the eye-level of the operator at the operator's station, a door in the front of the cab at one side of the basket to provide access to the basket from the interior of the cab, a platform extending forwardly of the cab and door to enable an operator to move from the door to the basket aforesaid, and means to operate the lift.

References Cited by the Examiner

UNITED STATES PATENTS

| | | | |
|---|---|---|---|
| 423,242 | 3/1890 | Griffin | 296—24 |
| 2,267,509 | 12/1941 | Strong | 296—24 |
| 2,724,620 | 11/1955 | Johnson | 182—2 |
| 2,821,312 | 1/1958 | Wiegel | 182—2 X |
| 2,878,054 | 3/1959 | Linder | 296—24 |
| 2,938,594 | 6/1960 | Eital | 182—2 |

HARRISON R. MOSELEY, *Primary Examiner.*

REINALDO P. MACHADO, *Examiner.*